United States Patent

Kashihara et al.

[11] Patent Number: 5,542,629
[45] Date of Patent: Aug. 6, 1996

[54] ESCAPE DEVICE FOR AIRCRAFT

[75] Inventors: Hideki Kashihara; Akira Nishimura; Toshihiko Takiguchi, all of Osaka, Japan

[73] Assignee: Sumitomo Electric Industries, Ltd., Osaka, Japan

[21] Appl. No.: 251,111

[22] Filed: May 31, 1994

[30] Foreign Application Priority Data

Jul. 9, 1993 [JP] Japan .................................. 5-170264
Jul. 9, 1993 [JP] Japan .................................. 5-170355

[51] Int. Cl.⁶ ............................................ B64D 1/08
[52] U.S. Cl. .................... 244/137.2; 244/905; 182/48; 193/25 B
[58] Field of Search .................... 244/905, 137.2; 193/25 B, 25 C; 182/48, 49

[56] References Cited

U.S. PATENT DOCUMENTS

| | | | |
|---|---|---|---|
| 4,115,351 | 9/1978 | Joh | 428/921 |
| 4,654,098 | 3/1987 | Miller | 244/137.2 |
| 5,110,850 | 5/1992 | Farkas | 524/100 |
| 5,248,185 | 9/1993 | Weingartner et al. | 244/129.2 |

*Primary Examiner*—Galen L. Barefoot
*Attorney, Agent, or Firm*—Wenderoth, Lind & Ponack

[57] ABSTRACT

In an escape device for an aircraft having a pair of air bags formed of sheet members and a slide surface, the sheet members have a high tear strength and excellent flame retardancy. The sheet members forming the air bags are a rubber covered fabric having a substrate of fabric and covering layers of a thermosetting elastomer which contains a flame retardant. By using a flame retardant in the form of needle-like crystals having a high aspect ratio and a small crystal grain diameter, the flame retardant will not aggregate in the elastomer, but will be uniformly dispersed, so that the bond strength between the substrate and the covering layer is high.

11 Claims, 4 Drawing Sheets

5,542,629

ESCAPE DEVICE FOR AIRCRAFT

BACKGROUND OF THE INVENTION

This invention relates to an escape device installed on an aircraft for use as an escape slide or a life-saving raft in case of an emergency such as an emergency landing.

Unexamined Japanese Patent Publication 59-152851 discloses an escape device for an aircraft of this type. It is normally stored in the aircraft in a folded state. In case of emergency, it is inflated by blowing gas thereinto to form a slide.

As shown in FIG. 1, this device comprises an opposed pair of cylindrical gas bags 1 formed by bonding flexible sheets together, and a sheet member provided between and secured to the gas bags 1. Its top surface serves as a slide surface 2. By inflating the gas bags 1 by blowing gas thereinto, this device can be used as a slide. In case the aircraft has landed on the sea, it can also be used as a life raft by detaching it from the aircraft, because the gas bags 1 have buoyancy.

It is required that sheet members 3 and 4, forming the gas bags 1 and the sliding surface 2 of the escape device, be foldable to a sufficiently small size and inflatable to a fairly large size.

When using the device as a slide, the gas bags 1 serve to hold the shape of the slide. Thus, they have to have a sufficient rigidity. If the device is used as a life raft, the bags serve as floats for keeping the raft afloat on the water. It is therefore essential that the joint portions of the sheets forming the gas bags stably exhibit a high bond strength and high air-tightness.

If a fire breaks out in an emergency situation, the escape device will be exposed to very high radiation heat. The joint portions of the sheets forming the gas bags are thus required to maintain their high bond strength even under high-temperature conditions. There is also the possibility that the escape device might catch fire. Thus, in order to prevent the sheet members 3 and 4 from burning, they are required to have a sufficient flame retardancy.

Also, in order that the sheet member forming the slide surface may not be torn apart from surface scratches that may be formed when passengers slide down, it has to be made of a material having a sufficient tear resistance.

To meet these requirements, as shown in FIG. 11, Unexamined Japanese Patent Publication 59-152851 proposes an escape device in which the sheet members 3 and 4 forming the gas bags and slide surface are in the form of a rubber coated fabric comprising a flexible substrate 41 made from a nylon fabric or the like and covering layers 42 and 43 of elastomers made from a thermoplastic polymer to give the sheet members sufficient strength and elasticity to be foldable and deformable when expanded.

The thermoplastic polymer forming the covering layers 42 and 43 contain various fillers for improved flame retardancy.

Such a rubber coated fabric comprising the substrate 41 and the elastomeric covering layers 42 and 43 has to be strongly bonded between its substrate and covering layers so that they will not peel off from each other when passengers slide down thereon. It was an ordinary practice to bond the covering layers 42 and 43 to the substrate 41 through an adhesive applied to both sides of the substrate to improve the bond strength between the substrate 41 and covering layers 42 and 43.

The adhesive applied to the substrate improves the bond strength between the covering layers and the substrate. But it also tends to harden the rubber coated fabric, thus lowering its tear strength.

One way to increase the flame retardancy of the rubber coated fabric is to improve the self-extinguishing properties of the covering layers 42 and 43 by adding flame-retardants to the elastomer forming the covering layers. But if the added flame-retardants are not dispersed uniformly, the flame resistance may decrease drastically, so that the rubber coated fabric is more likely to easily catch fire and burn.

Moreover, since the covering layers 42 and 43 of the sheet member 3 are made from a thermoplastic polymer, if exposed to radiation heat, the thermoplastic polymer itself may soften by heat. This lowers its strength. If exposed to high-temperature radiation heat, the thermoplastic polymer may melt and increase its fluidity. Since the gas pressure in the gas bags rises when heated, the covering layers of thermoplastic polymer may be pushed outwards. In an extreme case, the sheet member 3 may be broken. Air-tightness is lost if this happens.

Also, if the thermoplastic polymer forming the covering layers 42 and 43 contains fillers which shrink and stretch to different degrees than the polymer, if the sheet member 3 forming each gas bag 3 is stretched by the inner pressure, gaps may be formed between the polymer and the fillers because they are stretched to different degrees from each other. Such gaps can impair the air-tightness.

SUMMARY OF THE INVENTION

A first object of the present invention is to provide an escape device for use in an aircraft which has an improved bond strength between the substrate and its covering layers while maintaining a high tear strength, and which has a high flame retardancy such that, even if it catches fire, the fire can be quickly self-extinguished.

A second object of this invention is to provide an escape device for use in an aircraft in which the sheet members forming the gas bags can maintain air-tightness even if exposed to extremely high radiation heat whereby their shape can be retained stably.

In order to achieve the first object, according to this invention, the sheet members forming the gas bags and the slide surface are each formed of a rubber coated fabric comprising a flexible substrate, and single-layered or multi-layered covering layers formed on both sides of the substrate, with at least one of the covering layers containing a flame-retardant in the form of needle-like crystals having an aspect ratio of not less than 4 and having a crystal grain length of not more than 100 µm.

Preferably, the flame-retardant should contain bromine in the amount of not less than 50%.

On the other hand, in order to achieve the second object, according to this invention, the sheet members forming the gas bags are each formed of a rubber coated fabric comprising a flexible substrate and single-layered or multi-layered covering layers provided on each side of the substrate with at least one of the covering layers being made from a thermosetting elastomer that contains no filler.

The covering layer made from a filler-free thermosetting elastomer is preferably provided on the inner side of each gas bag. The filler-free thermosetting elastomer may be an ether type polyurethane polymer.

According to the present invention, a flame-retardant in the form of needle-like crystals having a high aspect ratio is used. When added to the elastomer, this flame-retardant is less likely to aggregate and is dispersed uniformly. The rubber coated fabric thus formed shows a high flame retardancy. If the flame-retardant has a crystal grain length of over 100 μm, a large surface area of the substrate will be covered by the flame-retardant. This makes it difficult for the elastomer to get into every recess of the substrate surface for proper bonding. This problem is solved by using a flame-retardant having a crystal grain length of not more than 100 μm. It is possible to further avoid poor bonding by using a flame-retardant having a grain length of 50 μm or less.

If the bromine content is not less than 50%, uniform flame retardance is possible for an elastomer having a low oxygen index, such as polyurethane, by adding a flame retardant in the amount of 100 phr or less.

In other words, by properly setting the crystal grain length of the flame-retardant added to the elastomer forming the covering layers, and the bromine content in the flame-retardant, it is possible to disperse the flame-retardant uniformly in the elastomer and to increase the bond strength between the covering layers and the substrate. This improves the bond strength and tear strength between the covering layers and the substrate. The sheet members thus formed will show such a high flame retardancy that, even if they catch fire, the fire can be extinguished quickly and spontaneously. Thus, it is possible to form an escape device having a high tear strength and excellent flame retardancy.

The sheet members forming the gas bags may be coated with a thermosetting elastomer containing no filler. If such sheets are exposed to radiation heat, the covering layer will not melt, but harden. Unlike a thermoplastic polymer, since they never melt and flow, the covering layer will never be deformed outwardly. This greatly reduces the possibility of the covering layers being broken and losing air-tightness.

Since the thermosetting elastomer forming the covering layers does not contain any fillers, the covering layers will be stretched exactly following the elongation of the sheet members of the gas bags if the latter are stretched due to changes in pressure. Thus, even if the sheet members are stretched, the covering layers will never be torn.

Also, since the filler-free thermosetting elastomer has a low viscosity, it is possible to form a thin, smooth-surfaced, sufficiently air-tight covering layer of such an elastomer on the inner surface of the air bag even if the inner surface of the sheet member forming the air bag is more or less rough.

Also, by using an ether type polyurethane polymer as the thermosetting elastomer, it is possible to make the covering layers sufficiently lightweight and highly resistant to hydrolysis.

In other words, the escape device can keep its shape as a slide or a life raft even if exposed to very high-temperature radiation heat. This makes it possible for passengers to safely escape from a wrecked plane.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

FIGS. 1 through 4 show the first embodiment of this invention.

Figure 1:
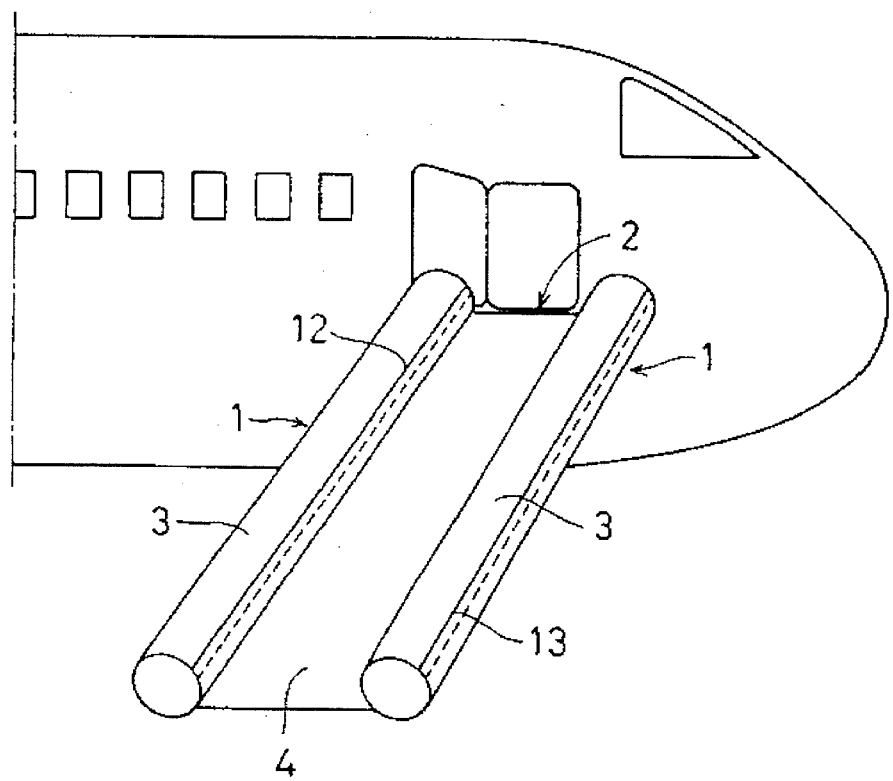
FIG. 1 is a perspective view of an aircraft escape device.

As shown in FIG. 1, the escape device of the first embodiment comprises cylindrical gas bags 1 formed of sheet members 3 and arranged parallel to each other, and a sheet member 4 forming a flat slide surface 2 and having both sides thereof bonded to the gas bags 1.

Figure 2:
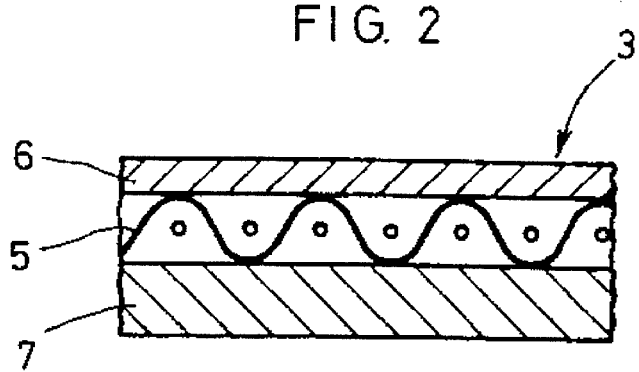
FIG. 2 is a sectional view showing the structure of the sheet member forming the gas bag of a first embodiment.

The sheet members 3 forming the gas bags 1 are formed of rubber coated fabrics comprising, as shown in FIG. 2, a substrate 5 of a flexible fabric and covering layers 6 and 7 covering the inner and outer surfaces of the substrate 5, respectively.

The inner covering layer 6 is made from an ether type thermosetting polyurethane polymer containing a flame-retardant to give self-extinguishing properties to the layer. The flame-retardant has a needle-like crystal structure having an aspect ratio of not less than 4 and a grain length of not more than 50 μm and contains 50% or more of bromine.

The outer covering layer 7 is made from an ether type thermosetting elastomer containing the above-described type of flame-retardant and further containing metallic powder such as aluminum powder. By adding the metallic powder, this layer can reflect radiation heat.

Figure 3:
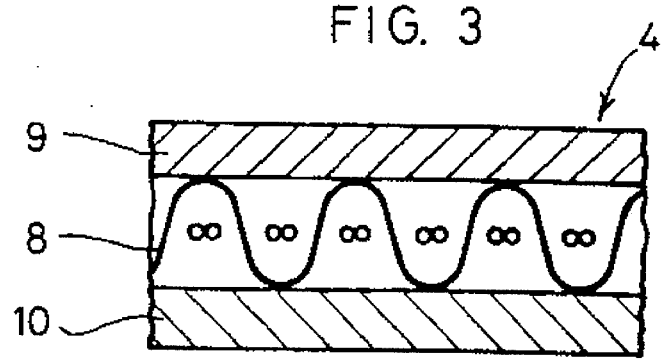
FIG. 3 is a sectional view showing the structure of the sheet member forming the slide surface of the same.

On the other hand, the sheet member 4 forming the slide surface 2 is a rubber coated fabric comprising, as shown in FIG. 3, a substrate 8 formed of a flexible fabric and covering layers 9 and 10 covering the inner and outer surfaces of the substrate 8, respectively.

The inner covering layer 9 is made from an ether type thermosetting polyurethane polymer containing the above-described type of flame-retardant to give self-extinguishing properties to the layer. The outer covering layer 10 is made from an ether type thermosetting elastomer containing the above-described type of flame-retardant and further containing a conductive material. The conductive material makes the slide surface electrically conductive and thus improves its sliding property.

Figure 4:
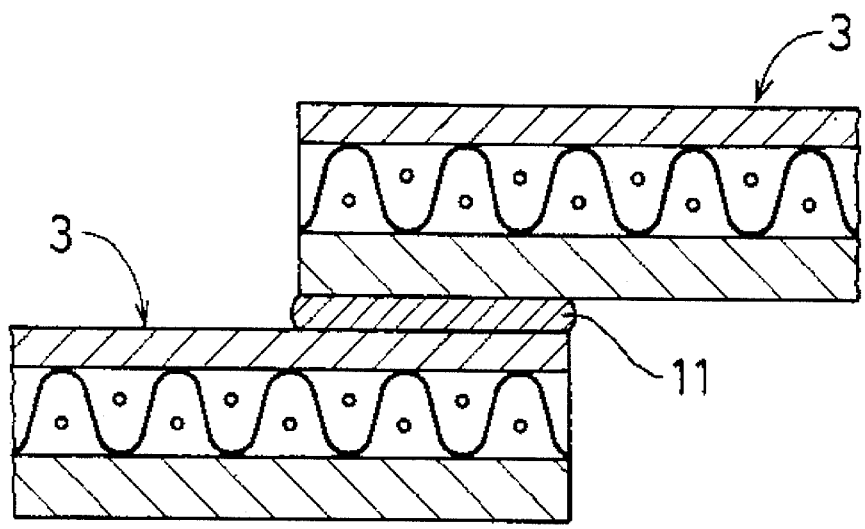
FIG. 4 is a sectional view showing the joint portion of the sheet members.

As shown in FIG. 4, the sheet members 3 forming the gas bags 1 have their ends overlapped by a predetermined width. The overlapped portions are bonded together (as shown by lines 12 and 13 in FIG. 1) through a heat-resistant polyurethane polymer type crosslinking adhesive 11.

On the other hand, the sheet member 4 forming the slide surface 2 is bonded at both ends thereof to the undersides of the opposite gas bags 1 by means of a crosslinking adhesive. The sheet member 4 is bonded with its conductive covering layer 10 facing up so that the slide surface is formed by the surface of this layer.

Now we will describe experiments conducted to examine the effects of the first embodiment.

According to the teachings of the first embodiment, we prepared a gas bag (Specimen 1) that contains a flame-retardant A in the covering layers of each sheet member, and a gas bag (Specimen 2) that contains in the covering layers a flame-retardant B of a different type from the flame-retardant A. We also prepared a gas bag (Comparative Specimen 1) that contains a flame-retardant C in the covering layers of each sheet member. They were tested for their bond strength, flame retardancy and tear strength.

Table 1 shows the structure of the sheet members and the adhesives used in Specimens 1, 2 and Comparative Specimen 1.

Table 2 shows the particulars of the flame-retardants A, B and C.

The flame-retardants A, B used in Specimens 1 and 2 are ones made by Manakku Co. under the trade name "EB-905". The flame-retardant C is one made by Ethyl Co. under the trade name "BT-93".

In the bond strength test, the bond strength as the resistance to peeling at 180 degrees was measured under TSO-C69b, Test Method 5970.

In the flame retardancy test, we measured the time taken to put out fire under FAR. Part 25, Appendix F.

Figure 5:
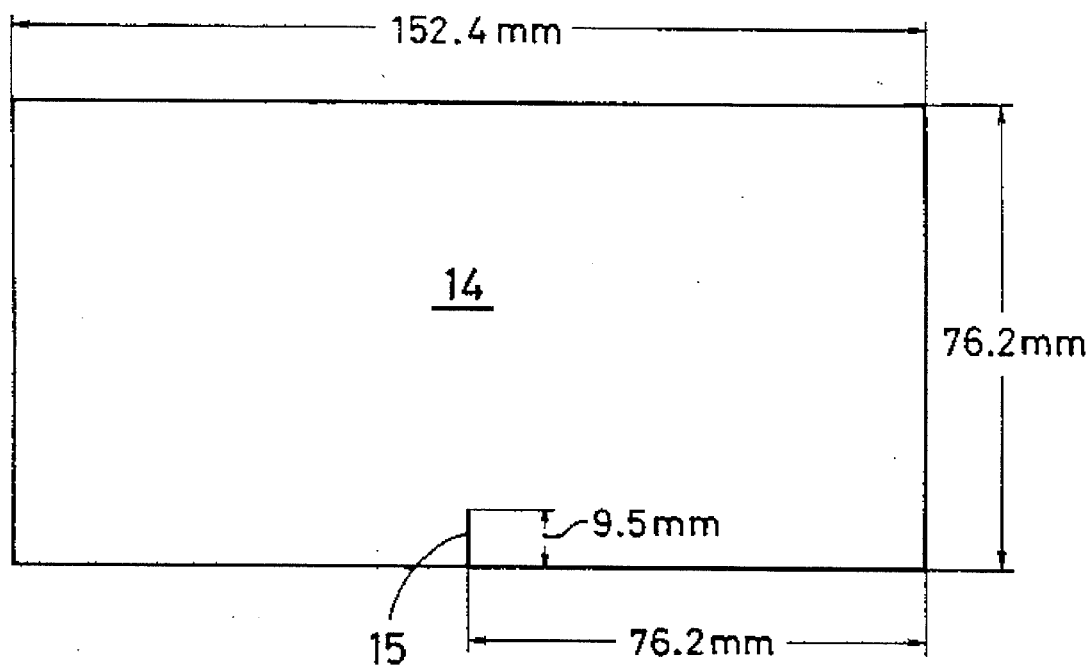
FIG. 5 is a view showing a test piece used in a tear test.

In the tear strength test, we cut off test pieces 14 of such a size as shown in FIG. 5 from the respective sheet members shown in FIG. 1 and formed a cut 15 in each test piece 14. They were then torn apart horizontally from the cut 15 at the rate of 300 mm/min. to measure the tear strength.

The test results are shown in Table 3.

In these tests, Specimens 1 and 2 achieved better results in bond strength and self-extinguishability than the Comparative Specimen 1. Specimen 2, in particular, showed far higher bond strength and self-extinguishability than the Comparative Specimen 1. As for the tear strength, there was no significant difference between Specimens 1, 2 and Comparative Specimen 1. This shows that the tear strength does not drop with the arrangement of the present invention.

FIGS. 6 to 10 show the second embodiment.

Figure 6:
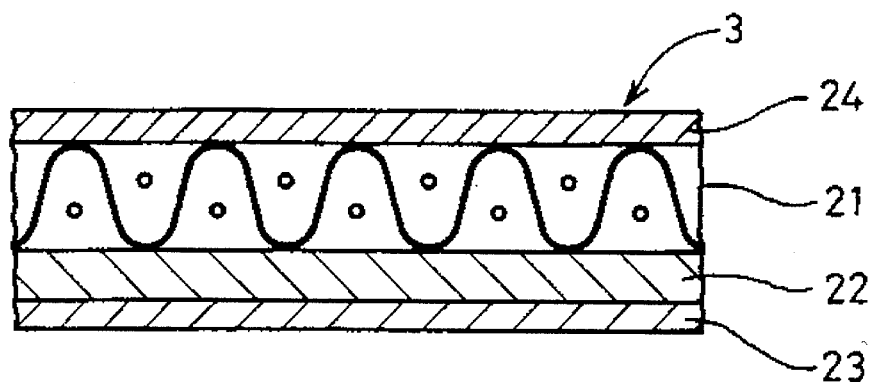
FIG. 6 is a sectional view showing the structure of the sheet member forming the gas bag of a second embodiment.

The second embodiment is basically the same in structure as the escape device shown in FIG. 1 but differs in the structure of the sheet members. FIG. 6 shows the internal structure of the sheet members 3 forming the gas bags 1. They comprise a substrate 21 formed of a flexible fabric, covering layers 22 and 23 covering the inner surface of the substrate 21, and a covering layer 24 covering the outer surface of the substrate 21.

The inner covering layer 22 is made from an ether type thermosetting elastomer formed by adding a flame-retardant to a polyurethane polymer to make the layer self-extinguishable. The innermost covering layer 23 is made from a filler-free ether type thermosetting elastomer and formed into a thin coating that uniformly covers the inner surface of the sheet member 3 to further improve its air-tightness.

On the other hand, the outer covering layer 24 is made from an ether type thermosetting elastomer containing the above-mentioned type of flame-retardant and further containing metallic powder such as aluminum powder.

Figure 7:
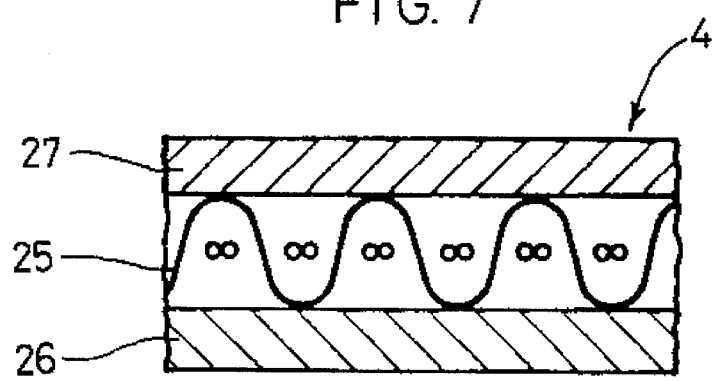
FIG. 7 is a sectional view showing the structure of the sheet member forming the slide surface of the same.

FIG. 7 shows the structure of the sheet member 4 forming the slide surface 2.

The sheet member 4 forming the slide surface 2 comprises, as with the first embodiment, a substrate 25 formed of a flexible fabric, and covering layers 26 and 27 covering the substrate 25. The inner covering layer 26 is made from an ether type thermosetting elastomer formed by adding a flame-retardant to a polyurethane polymer to give the layer self-extinguishing properties. The outer covering layer 27 is made from a thermosetting elastomer containing the above-mentioned type of flame-retardant and a conductive material. (FIG. 7)

Figure 8:
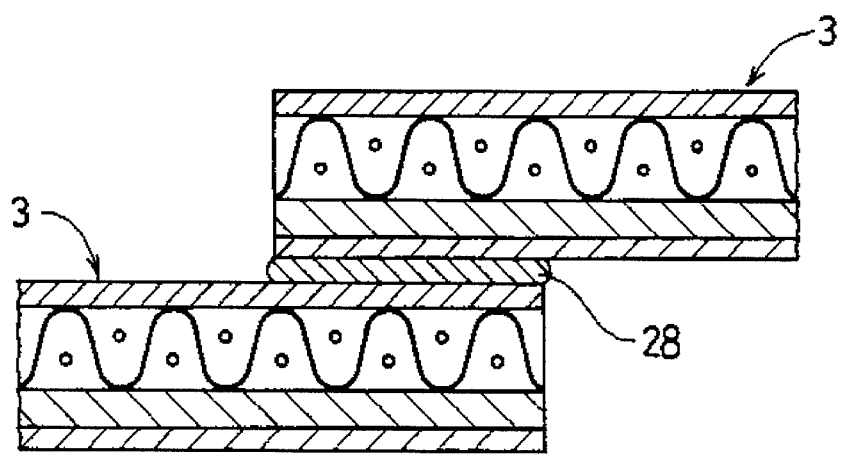
FIG. 8 is a sectional view showing the joint portion between the sheet members of the same.

The sheet members 3 forming the gas bags 1 have their ends overlapped and bonded together by means of a heat-resistant polyurethane polymer type crosslinking adhesive 28 in the same manner as in the first embodiment (FIG. 8). The sheet member 4 forming the slide surface 2 has both sides thereof bonded to the undersides of the oppositely arranged gas bags 1 by means of a crosslinking adhesive.

In the second embodiment, since the covering layers 22, 23, 24, 26 and 27 of the sheet members 3 and 4 are made from a thermosetting elastomer, they are less likely to melt and flow even if the sheet members are exposed to high radiation heat. Thus, the sheet members can keep air-tightness.

Since the innermost covering layer 23 of each sheet member 3 forming the gas bags 1 is made from a thermosetting elastomer not containing fillers, this layer stretches and shrinks evenly. Thus, if the inner pressure rises so that the sheet members 3 are stretched, the thermoplastic elastomer in this layer is stretched at exactly the same rate. This prevents breakage of the covering layer and thus decrease in air-tightness.

Moreover, since the covering layers are made from a polyurethane-polymer-based thermosetting elastomer, they are relatively lightweight and are high in wear resistance and adhesion. Also, since this polyurethane polymer can be hardened at room temperature by adjusting the hardening agent used, it can be manufactured easily. Furthermore, an ether type polyurethane polymer has higher resistance to hydrolysis and thus higher water resistance than an ester type.

The covering layer 22, provided on the inner surface of the substrate 21, may be made from a filler-free thermosetting elastomer.

We will now describe experiments conducted to examine the effects of the second embodiment.

We prepared a gas bag (Specimen 3) according to the teaching of the second embodiment, and a gas bag (Specimen 4) that structurally differs from the second embodiment only in that the positions of the inner covering layers 22 and 23 are reversed. We also prepared a gas bag (Comparative Specimen 2) according to the teaching of the above-mentioned Unexamined Japanese Patent Publication 59-152851. They were tested for durability when exposed to radiation heat.

Table 4 shows the structure of the sheet members forming Specimens 3 and 4 and Comparative Specimen 2 and the adhesives used therein.

Figure 10:
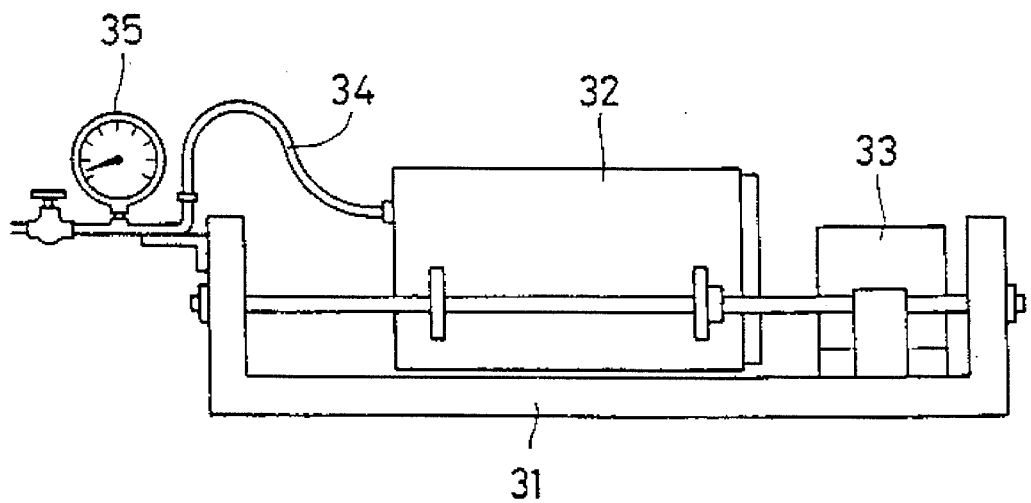
FIG. 10 is a view showing the device used in the heat test.
Figure 11:
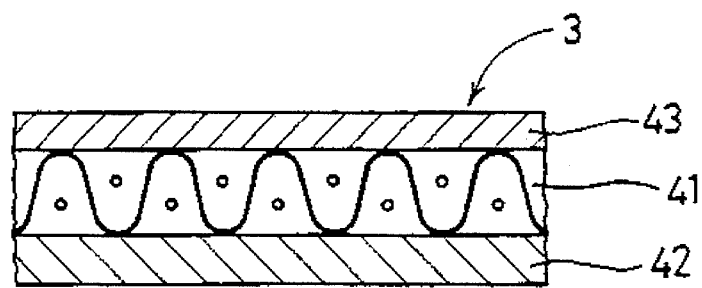
FIG. 11 is a sectional view showing the bonding structure of a conventional sheet member.

The test device used in the durability test is shown in FIG. 10. It has a pressure container 32 for fitting the gas bags, and an electric heater 33 provided opposite to the pressure container 32. They are mounted on a fixed base 31. To the pressure container 32 are connected a hose 34 for supplying high-pressure air and a pressure gauge 35. The pressure container 32 is a cylindrical member having a diameter of 178 mm and an overall length of 314 mm.

Figure 9:
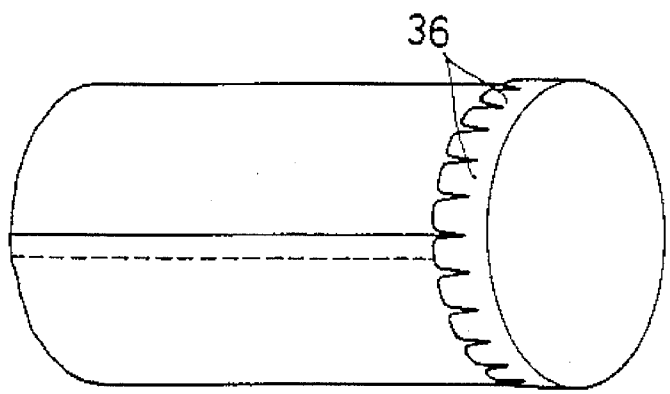
FIG. 9 is a perspective view of the gas bag used in the heat test.

As shown in FIGS. 9 and 10, the gas bags used in the test were cylindrically shaped so that they can be fitted in the pressure container 32. The end of the gas bag is closed by pressing another sheet member against the end of the gas bag and folding its end at 36.

In Table 4, the thermosetting elastomer forming the covering layers of the sheet members of Specimens 3 and 4 was obtained by adding BT-93W (trade name) made by Ethyl Co. and antimony trioxide to a polyurethane polymer base containing a flame-retardant made up of POLYOL 0265 and ISOCYANATE 0626 (both trade names) made by Sumitomo Bayer Urethane.

The thermoplastic polymer forming the covering layers of Comparative Specimen 2 was Mirakutoran (trade name) made by Japan Mirakutoran Co.

In the durability test, test pieces cut off from the gas bags of Specimens and Comparative Specimen were fitted in the pressure container 32 of the test device of FIG. 10. In this state, the inner pressure of the pressure container 32 was increased to 0.183 kgf/cm$^2$ by introducing air therein and then the electric heater 33 was activated to heat by irradiation the surface of the sheet members of the gas bag at the rate of 2.0 Btu/ff/sec.

In this test, we measured the time elapsed until air leaked through pin holes that developed in the sheet members of the gas bag by being heated so that the inner pressure dropped sharply.

In the test, when the gas bag of Comparative Specimen 2, which was coated with a thermoplastic polymer, was heated 150 seconds, its covering layers melted and flowed outwards by the internal gas pressure. The sheet members were thus broken and the internal gas leaked out.

In contrast, the gas bag of Specimen 4 was kept sufficiently air-tight until 600 seconds had passed. As for the gas bag of Specimen 3, its covering layers never softened or melted and thus the gas bag was kept sufficiently air-tight until 900 seconds had passed, though the surfaces of the sheet members turned brown.

TABLE 1

|  | Specimen 1 | Specimen 2 | Comparative Specimen 1 |
| --- | --- | --- | --- |
| Substrate | Nylon fabric 2 × 2 basket weave of 210 denier nylon yarn | Nylon fabric 2 × 2 basket weave of 210 denier nylon yarn | Nylon fabric 2 × 2 basket weave of 210 denier nylon yarn |
| (Density) | 41 warps and 41 wefts/inch | 41 warps and 41 wefts/inch | 41 warps and 41 wefts/inch |
| (Weight) | 160 g/m$^2$ | 160 g/m$^2$ | 160 g/m$^2$ |
| Covering layer (Inner side) | Thermosetting elastomer containing flame-retardant A | Thermosetting elastomer containing flame-retardant B | Thermosetting elastomer containing flame-retardant C |
| (Weight) | 80 g/m$^2$ | 80 g/m$^2$ | 80 g/m$^2$ |
| Covering layer (Outer side) | Thermosetting elastomer containing flame-retardant A and aluminum powder | Thermosetting elastomer containing flame-retardant B and aluminum powder | Thermosetting elastomer containing flame-retardant C and aluminum powder |
| (Weight) Adhesive | 30 g/m$^2$ Polyurethane polymer type crosslinking adhesive | 30 g/m$^2$ Polyurethane polymer type crosslinking adhesive | 30 g/m$^2$ Polyurethane polymer type crosslinking adhesive |

TABLE 2

|  | Flame retardant A | Flame retardant B | Flame retardant C |
| --- | --- | --- | --- |
| Type | EB-905 (Trade name) | Pulverized material of EB-905 (Trade name) | BT-93 (Trade name) |
| Shape | Needle-like | Needle-like | Ball-like |
| Bromine content (%) | 65 | 65 | 80 |
| Grain length (μm) | 80 | 10 | 150 |
| Aspect ratio | 8 | 5 | 2 |

TABLE 3

|  | Specimen 1 | Specimen 2 | Comparative Specimen 1 |
| --- | --- | --- | --- |
| Bond strength (kg/inch) | 2.0 | 3.5 | 1.5 |
| Time taken for extinguishing (sec.) | 2 | 0* | 14 |
| Tear strength (kg) | 12 | 12 | 12 |

*It goes out itself after it is ignited. In other words, it is almost flame-retardant.

TABLE 4

|  | Specimen 3 | Specimen 4 | Comparative Specimen 2 |
| --- | --- | --- | --- |
| Substrate | Nylon fabric 2 × 2 basket weave of 210 denier nylon yarn | Nylon fabric 2 × 2 basket weave of 210 denier nylon yarn | Nylon fabric plain weave of 210 denier nylon yarn |
| (Density) | 41 warps and 41 wefts/inch | 41 warps and 41 wefts/inch | 82 warps and 52 wefts/inch |
| (Weight) | 160 g/m$^2$ | 160 g/m$^2$ | 130 g/m$^2$ |
| Covering layer Inner side (Substrate side) | Thermosetting elastomer containing flame-retardant | Thermosetting elastomer only | Thermoplastic elastomer containing flame-retardant |
| (Weight) | 80 g/m$^2$ | 40 g/m$^2$ | 70 g/m$^2$ |
| Covering layer (Innermost side) | Thermosetting elastomer only | Thermosetting elastomer containing flame-retardant | None |
| (Weight) | 40 g/m$^2$ | 80 g/m$^2$ |  |
| Covering layer Outer side | Thermosetting elastomer containing aluminum powder | Thermosetting elastomer containing aluminum powder | Thermoplastic polymer containing aluminum powder |
| (Weight) Adhesive | 30 g/m$^2$ Polyurethane polymer type crosslinking adhesive | 30 g/m$^2$ Polyurethane polymer type crosslinking adhesive | 30 g/m$^2$ Polyurethane polymer adhesive |

What is claimed is:

1. An escape device for aircraft, comprising:

a pair of gas bags, wherein each one of said gas bags comprises a sheet member bonded into a cylindrical shape, and wherein said gas bags are arranged parallel to each other;

a slide sheet member defining a slide surface, said slide sheet member being located between and bonded to said pair of gas bags;

wherein each one of said of sheet members of said gas bags and said slide sheet member comprises a rubber coated fabric, said rubber coated fabric comprising a flexible substrate and elastomer covering layers on respective sides of said substrate; and wherein at least one of said covering layers comprises a flame-retardant comprising needle-like crystals having an aspect ratio$\geqq 4$ and having a crystal grain length$\leqq 100$ µm.

2. The escape device of claim 1, wherein said flame retardant further comprises at least 50% of bromine.

3. The escape device of claim 1, wherein said gas bags each have an outer side and an inner side, each of said covering layers on said outer sides of said gas bags comprising said flame retardant.

4. The escape device of claim 1, wherein each of said covering layers comprises said flame retardant.

5. The escape device of claim 2, wherein said covering layers on said inner sides of said gas bags comprise an ether type thermosetting polyurethane polymer containing said flame retardant.

6. The escape device of claim 2, wherein said covering layers on said outer sides of said gas bags comprise an ether type thermosetting polyurethane polymer containing said flame retardant and further containing metallic powder.

7. The escape device of claim 6, wherein said metallic powder is aluminum powder.

8. The escape device of claim 1, wherein said covering layer of said slide surface of said slide sheet member comprises an ether type thermosetting polyurethane polymer containing said flame retardant.

9. The escape device of claim 8, wherein said ether type thermosetting polyurethane polymer further contains a conductive material.

10. The escape device of claim 8, wherein both of said covering layers of said slide sheet member comprise an ether type thermosetting polyurethane polymer containing said flame retardant.

11. The escape device of claim 1, wherein said needle-like crystals have a crystal grain length$\leqq 50$ µm.

* * * * *